(12) United States Patent
Ebner

(10) Patent No.: US 8,613,146 B2
(45) Date of Patent: Dec. 24, 2013

(54) COMPACT HACKSAW

(75) Inventor: Jeremy R. Ebner, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 674 days.

(21) Appl. No.: 12/708,263

(22) Filed: Feb. 18, 2010

(65) Prior Publication Data

US 2011/0061248 A1 Mar. 17, 2011

Related U.S. Application Data

(60) Provisional application No. 61/242,961, filed on Sep. 16, 2009.

(51) Int. Cl.
*B27B 21/00* (2006.01)

(52) U.S. Cl.
USPC .................. 30/507; 30/517; 30/513; 30/523

(58) Field of Classification Search
USPC ........... 30/392, 517, 507, 513, 522, 382, 508, 30/523–524, 342, 337; 83/699.51, 698.11, 83/699.21; 403/323, 322.1, 374.3, 374.5
See application file for complete search history.

(56) References Cited

U.S. PATENT DOCUMENTS

| | | | | |
|---|---|---|---|---|
| 1,698,788 | A * | 1/1929 | Gibson | 30/522 |
| 2,452,148 | A * | 10/1948 | Rhodes | 30/517 |
| 3,447,580 | A * | 6/1969 | Keymer | 30/517 |
| 3,756,298 | A | 9/1973 | West | |
| 4,233,737 | A * | 11/1980 | Poehlmann | 30/335 |
| 4,294,013 | A * | 10/1981 | Krieg | 30/392 |
| 4,651,425 | A | 3/1987 | Livian | |

(Continued)

FOREIGN PATENT DOCUMENTS

| | | |
|---|---|---|
| DE | 20119918 U1 | 2/2002 |
| KR | 2001050430 A | 6/2001 |
| WO | 2007100339 A1 | 9/2007 |

OTHER PUBLICATIONS

Great Britain Search Report for Application No. GB1015289.0, dated Jan. 11, 2011, (3 pages).

(Continued)

*Primary Examiner* — Omar Flores Sanchez
(74) *Attorney, Agent, or Firm* — Michael Best & Friedrich LLP

(57) ABSTRACT

A hacksaw including a removable blade has a handle including a recess configured to receive the blade and a frame including a first end and a second end. The first end of the frame is coupled to the handle and the second end extends away from the handle. The hacksaw also includes a blade retention mechanism coupled to the second end of the frame for coupling the blade to the second end of the frame. The blade retention mechanism includes an adjustable fastener coupled to the frame and coupling the blade retention mechanism to the frame, a resilient member seated on the fastener, a retaining member seated on the fastener, the retaining member spaced apart from the frame by a gap and the gap having a width, and a lever coupled to the fastener and movable between a first position and a second position. Moving the lever to the first position reduces the width of the gap to clamp the blade within the blade retention mechanism and couple the blade to the frame, and moving the lever to the second position increases the width of the gap to release the blade from the blade retention mechanism.

25 Claims, 11 Drawing Sheets

(56) References Cited

U.S. PATENT DOCUMENTS

| | | | |
|---|---|---|---|
| 4,680,863 | A | 7/1987 | Duffy |
| 4,835,869 | A | 6/1989 | Waldherr |
| D359,436 | S * | 6/1995 | Weimann .......................... D8/97 |
| 5,471,752 | A | 12/1995 | Koetsch |
| 6,105,482 | A * | 8/2000 | Garcia et al. ................ 83/698.31 |
| 6,158,131 | A | 12/2000 | Costanzo et al. |
| 6,711,825 | B2 | 3/2004 | Chen |
| 6,789,326 | B1 | 9/2004 | Huang |
| 6,860,669 | B2 * | 3/2005 | Laisement et al. .......... 403/109.1 |
| 7,168,172 | B1 * | 1/2007 | Wang .............................. 30/517 |
| 7,269,905 | B1 | 9/2007 | Huang |
| 7,516,554 | B2 | 4/2009 | Ping |
| 7,717,011 | B2 * | 5/2010 | Hirooka .......................... 74/493 |
| 2006/0168825 | A1 | 8/2006 | Tseng |
| 2006/0213068 | A1 | 9/2006 | Chen |
| 2007/0101592 | A1 * | 5/2007 | Wen ................................ 30/517 |
| 2007/0131075 | A1 | 6/2007 | Zhang et al. |
| 2007/0151115 | A1 * | 7/2007 | Ping ................................ 30/517 |
| 2008/0092400 | A1 | 4/2008 | Circosta et al. |
| 2010/0018065 | A1 * | 1/2010 | Janssson et al. ................ 30/517 |

OTHER PUBLICATIONS

GB1015289.0 United Kingdom Examination Report dated May 4, 2012, 1 page.

10" Mini-Hack Saw. Retrieved from http://www.stanleytools.com/default.asp? CATEGORY=HACKSAWS&TYPE=PRODUCT&PARTNUMBER=20-807&SDesc=10%26%2334%3B+Mini-Hack%26% 23153%3B+Saw on May 25, 2010.

Images of mini hack saw, received from K&W Tools on Sep. 28, 2009.

* cited by examiner

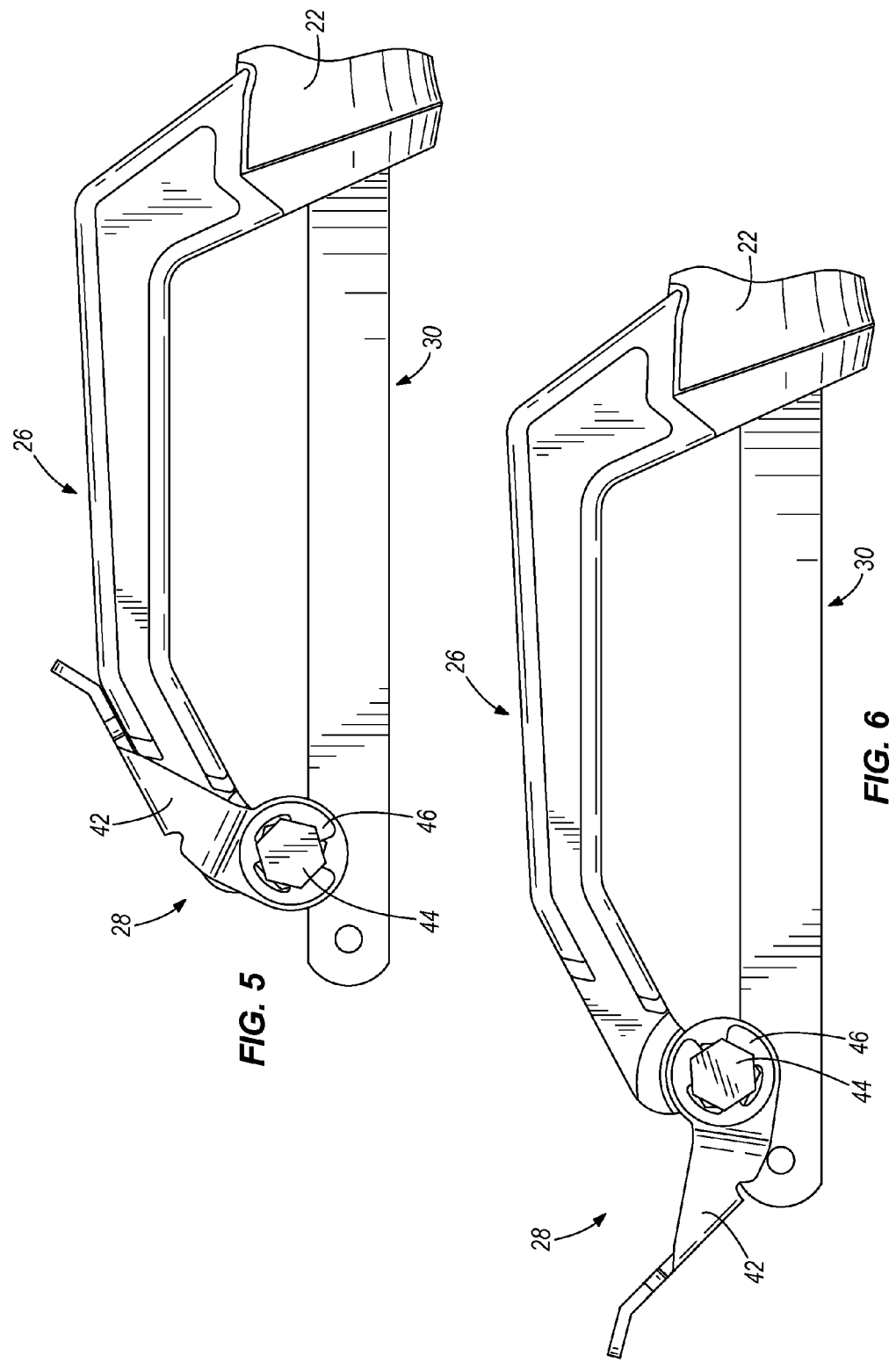

COMPACT HACKSAW

CROSS-REFERENCE TO RELATED APPLICATION(S)

This application claims priority to U.S. Provisional Patent Application No. 61/242,961 filed on Sep. 16, 2009, the entire contents of which is incorporated herein by reference.

BACKGROUND OF THE INVENTION

The invention relates to hand tools, and more particularly to compact hacksaws.

Compact hacksaws provide a user with greater portability and the ability to perform cutting in confined spaces that do not allow for a larger saw. Current compact hacksaws require a tool to remove and replace the hacksaw blade, and are not readily adjustable for different hacksaw blade widths and for variance in tolerances. In addition, current compact hacksaws clamp the blade along the blade teeth, which causes damage to the teeth.

SUMMARY OF THE INVENTION

In one embodiment, the invention provides a hacksaw including a handle having a first recess and a frame having a first end and a second end, the first end coupled to the handle and the second end extending away from the handle, the second end of the frame defining a second recess. The hacksaw also includes a saw blade having a first end, a second end, a first side, and a second side, the first end of the saw blade received within the first recess of the handle and the second end of the saw blade extending away from the handle. A portion of the saw blade is removeably coupled to the second end of the frame. A blade retention mechanism is coupled to the second end of the frame. The blade retention mechanism includes a fastener coupled to the second end of the frame for coupling the blade retention mechanism to the frame. The blade retention mechanism includes a resilient member seated on the fastener, a retaining member seated on the fastener adjacent the second recess of the frame, and a lever coupled to the fastener. The lever is movable between a first position to couple the saw blade to the frame and a second position to release the saw blade from the frame. The portion of the saw blade removably coupled to the second end of the frame is positioned within the second recess of the frame and between the frame and the retaining member such that the first side of the saw blade engages the frame and the second side of the saw blade engages the retaining member. When the lever is moved to the first position, the lever tightens the blade retention mechanism in order to compress the resilient member and clamp the saw blade between the frame and the retaining member. When the lever is rotated to the second position, the lever loosens the blade retention mechanism in order to reduce compression on the retaining member.

In another embodiment, the invention provides a hacksaw including a removable blade. The hacksaw includes a handle including a recess configured to receive the blade, a frame including a first end and a second end, the first end of the frame coupled to the handle and the second end extending away from the handle. The hacksaw also includes a blade retention mechanism coupled to the second end of the frame and for coupling the blade to the second end of the frame. The blade retention mechanism includes an adjustable fastener coupled to the frame and coupling the blade retention mechanism to the frame, a resilient member seated on the fastener, a retaining member seated on the fastener, the retaining member spaced apart from the frame by a gap and the gap having a width, and a lever coupled to the fastener. The lever is movable between a first position and a second position, wherein moving the lever to the first position reduces the width of the gap to clamp the blade within the blade retention mechanism and couple the blade to the frame, and moving the lever to the second position increases the width of the gap to release the blade from the blade retention mechanism.

Other aspects of the invention will become apparent by consideration of the description and accompanying drawings.

BRIEF DESCRIPTION OF THE DRAWINGS

FIG. 5 is a partial side view of the hacksaw shown in FIG. 1 with the blade retention mechanism shown in the blade coupling position.

FIG. 6 is a partial side view of the hacksaw shown in FIG. 1 with the blade retention mechanism shown in a blade release position.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
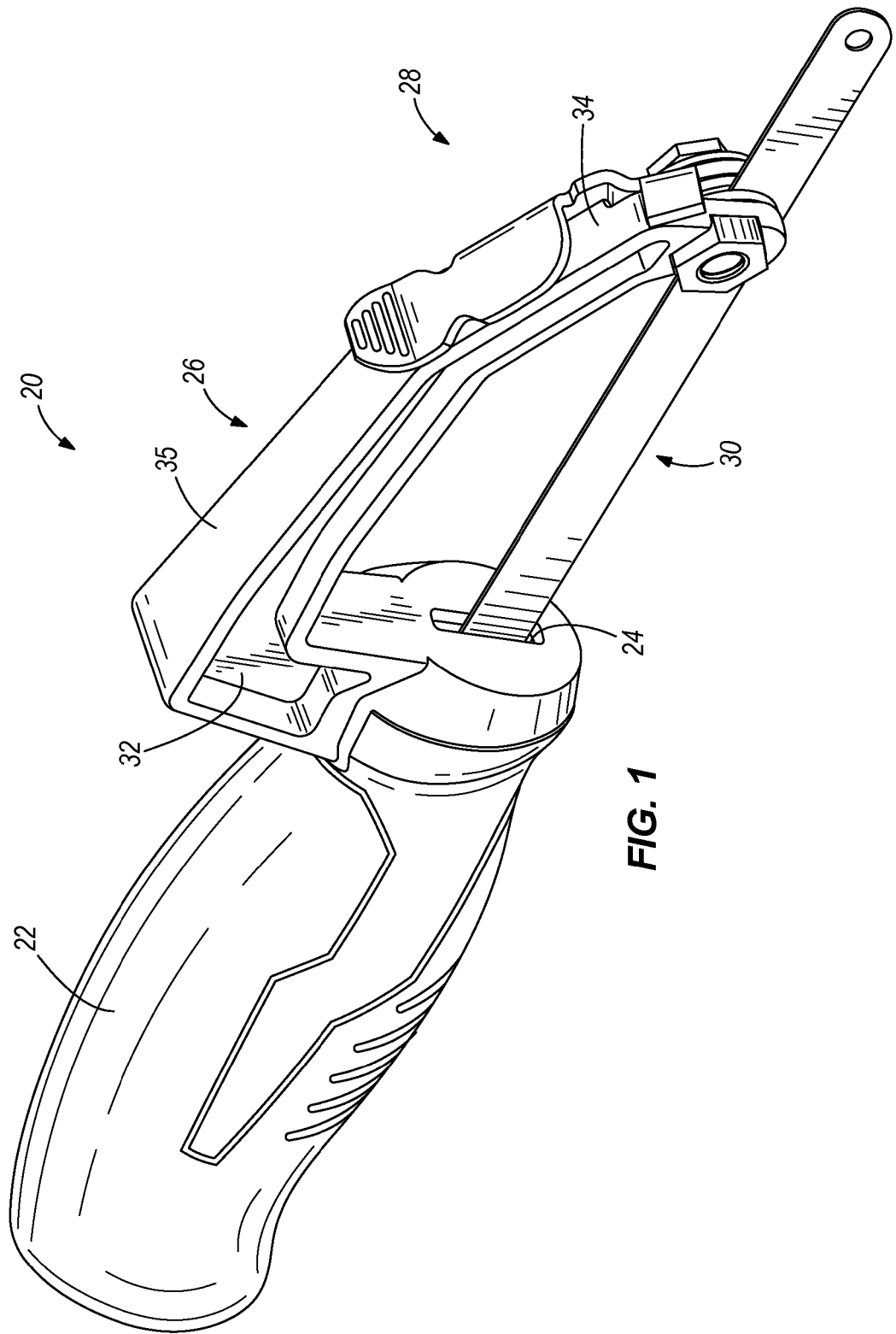
FIG. 1 is a perspective view of a hacksaw including a blade retention mechanism according to one embodiment of the invention.
Figure 2:
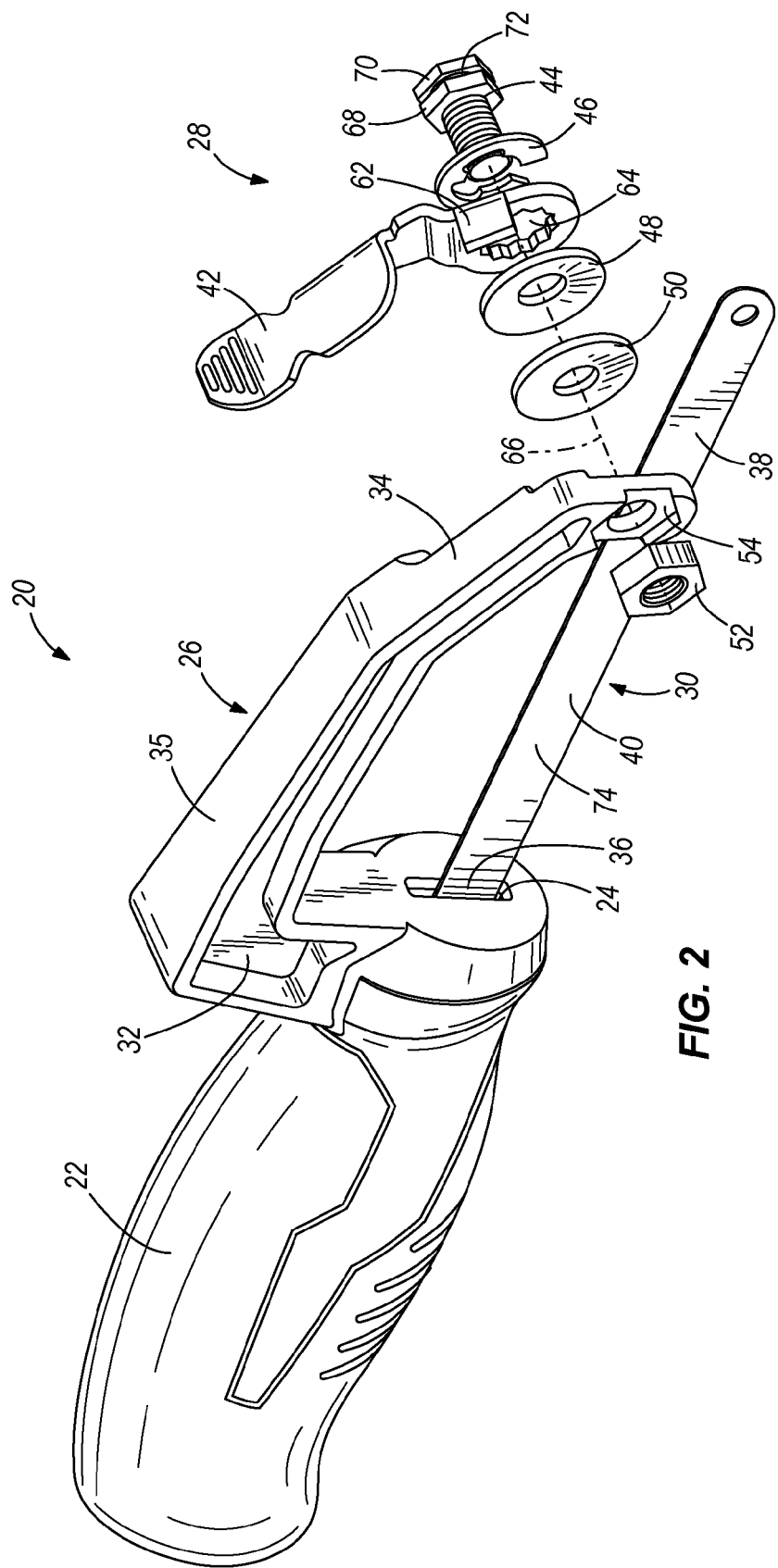
FIG. 2 is an exploded perspective view of the hacksaw shown in FIG. 1.

FIGS. 1 and 2 illustrate a compact hacksaw 20 including a handle 22 having a recess 24, a support frame 26, a blade retention mechanism or fastening mechanism 28, and a hacksaw blade 30. The frame 26 includes a first leg 32 coupled to the handle 20, a second leg 34 that supports the blade retention mechanism 28, and a cross-member 35 that extends between the first and second legs 32, 34. The blade 30 includes a first end 36 positioned within the recess 24, a second end 38 opposite the first end 36, and an intermediate portion 40 extending between the two ends 36, 38. In the illustrated embodiment, the intermediate portion 40 of the blade 30 is coupled to the second leg 38 of the frame 26 by the blade retention mechanism 28; however, in further embodiments, the second end 38 may be coupled to the frame 26 by the blade retention mechanism 28.

Figure 3:
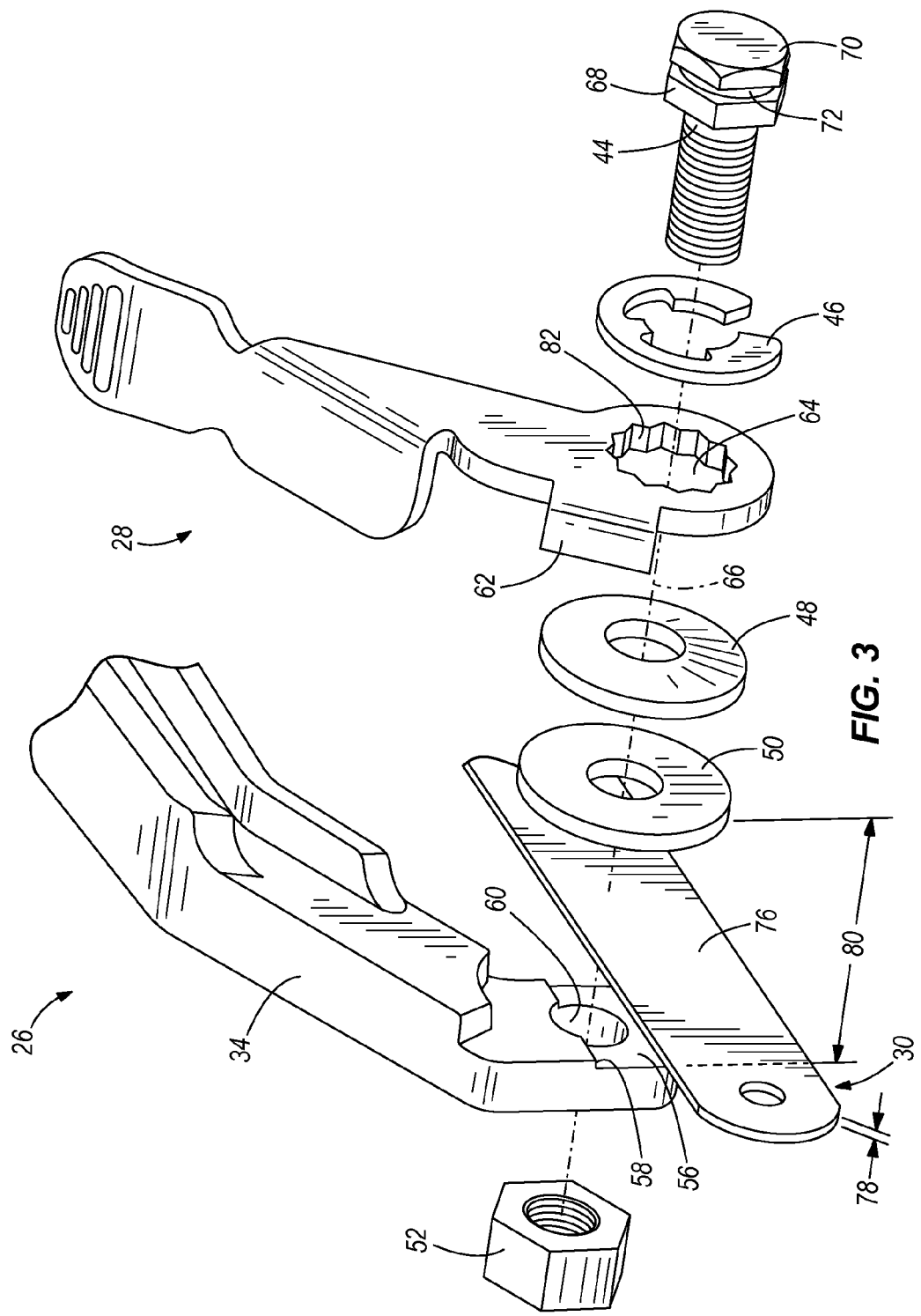
FIG. 3 is an exploded perspective view of the blade retention mechanism and a portion of the hacksaw shown in FIG. 1.

Referring to FIGS. 2 and 3, the blade retention mechanism 28 includes a lever 42, a fastener 44, a clip 46, a resilient member 48, a washer 50, and a nut 52. The second leg 34 of the frame 26 includes a recess 54 positioned on one side of the leg 34 for receiving the nut 52, a recess 56 having a shoulder 58 on an opposite side of the leg 34 for seating and aligning the blade 30 relative to the frame 26, and an aperture 60 passing between the two sides of the leg 34. When assembled, the blade 30 is sandwiched between the frame 26 and another portion of the blade retention mechanism 28 (i.e., the lever 42, the fastener 44, the clip 46, the resilient member 48, and the washer 50 in the illustrated embodiment).

The lever 42 includes a tab 62 and a socket 64 for receiving the fastener 44, and the fastener 44 defines a pivot axis 66 for the blade retention mechanism 28 and the lever 42. In the illustrated embodiment, the fastener 44 is a threaded bolt including an inner bolt head 68, an outer bolt head 70, and a clip slot 72 positioned between the bolt heads 68, 70 for receiving the clip 46. In further embodiments, other fasteners may be used with the blade retention mechanism 28. In the illustrated embodiment, the resilient member 48 is a Belleville washer, although in further embodiments other types of resilient members or biasing members may be used, such as a coil spring.

Figure 4:
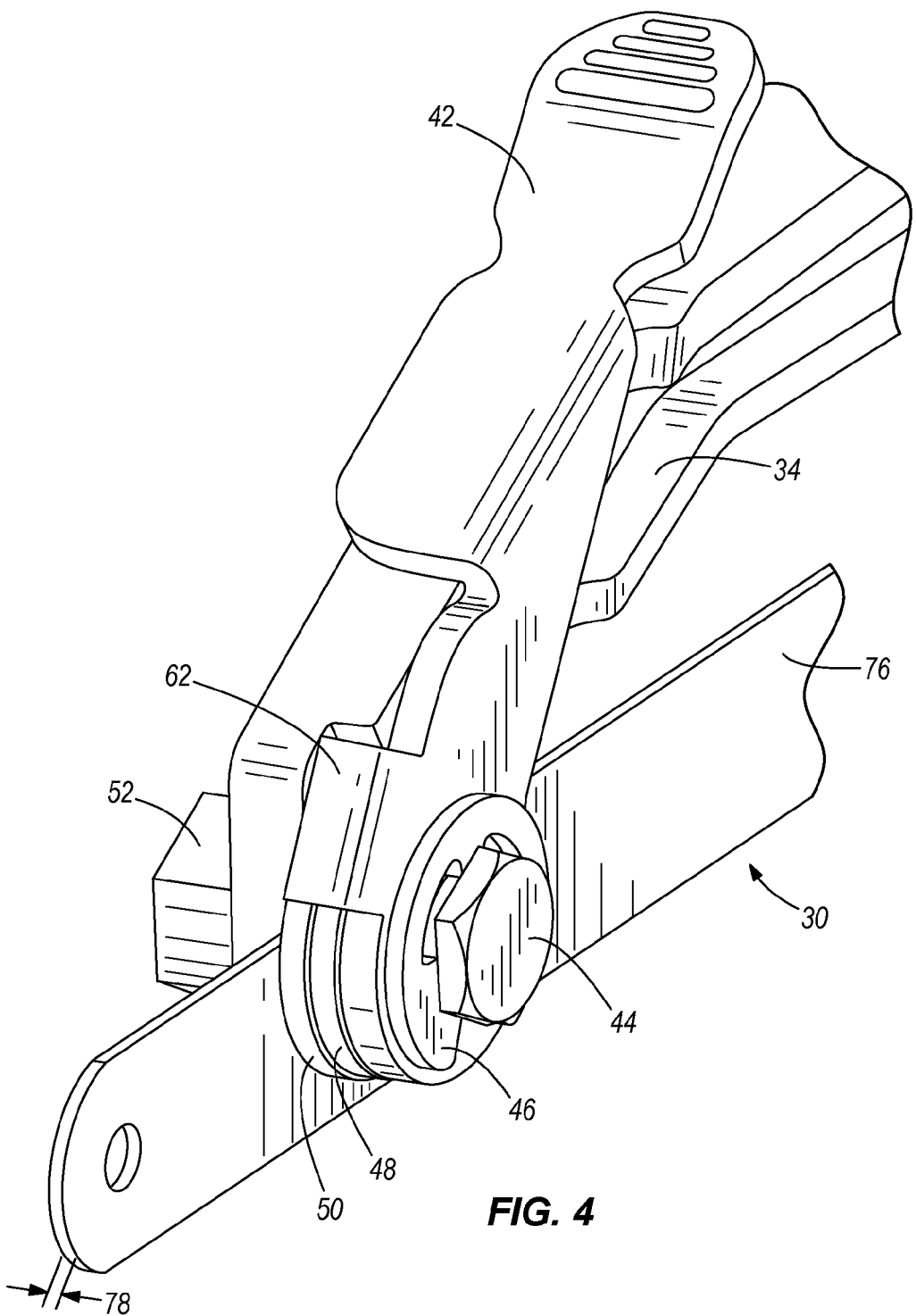
FIG. 4 is a partial perspective view of the hacksaw shown in FIG. 1 with the blade retention mechanism in a blade coupling position.

Referring to FIGS. 3 and 4, when assembled, the fastener 44 passes through the socket 64 of the lever 42, the resilient member 48, the washer 50, the aperture 60 of the frame 26 and the nut 52. In the illustrated embodiment, the fastener 44 threadably engages the nut 52 to hold the blade retention mechanism 28 together and couple the blade retention mechanism 28 to the hacksaw 20. The hacksaw blade 30 is positioned between the washer 50 and the frame 26, and is within the recess 54. A first side 74 of the blade 30 interfaces with the frame 26 and is seated along the shoulder 58 and a second side 76 of the blade 30 interfaces with the washer 50. A blade width 78 is defined between the first side 74 and the second side 76 of the blade 30. The washer 50 and the frame 26 are spaced apart from each other to form a gap 80 that is adjustable, as described below, to accommodate blades 30 of differing widths 78. The resilient member 48 is positioned between the washer 50 and the lever 42, and biases the washer 50 toward the frame 26 and into engagement with the blade 30. The socket 64 of the lever 42 is sized to receive the inner bolt head 68 of the fastener 44, and the lever 42 includes teeth 82 about a periphery of the socket 64 for engaging the inner bolt head 68 in order to rotate the fastener 44 relative to the frame 26. The lever 42 is removeably coupled to the fastener 44 by the clip 46, which is seated within the clip slot 72. The tab 62 of the lever 42 extends over an interface between the lever 42 and the resilient member 48 and an interface between the resilient member 48 and the washer 50.

The lever 42 is rotatable about the pivot axis 66 between a blade coupling position, illustrated in FIGS. 4 and 5, and a blade release position, illustrated in FIG. 6. Rotating the lever 42 about the pivot axis 66 into the blade coupling position, in which the lever lies against the frame 26, tightens the fastener 44 into the nut 52 via the inner bolt head 68. As fastener 44 is tightened, the fastener 44 progressively engages the resilient member 48, which in turn acts on the washer 50 to force the washer 50 toward the frame 26 and the blade 30. Once the lever 42 is in the blade coupling position, the fastener 44 and the resilient member 48 provide a compressive force on the washer 50 to secure the blade 30 to the frame 26. The resilient member 48 maintains compression in the blade retention mechanism 28 over a broad range of engagement between the fastener 44 and the nut 52, including up until the blade 30 is securely coupled to the frame 26.

In the blade release position, the lever 42 is rotated away from the frame 26 about the pivot axis 66 to unthread the fastener 44 from the nut 52, and thereby loosen the blade retention mechanism 28. As the fastener 44 is loosened, the resilient member 48 reduces the compressive force applied to the washer 50; thereby, allowing the washer 50 to move relative to the frame 26 and permit removal of the blade 30. In some conditions, the resilient member 48 maintains some compression in the blade retention mechanism 28 when the lever 42 is in the blade release position; however, in most conditions the compression is reduced to zero.

In order to secure the blade 30 to the frame 26, a user first rotates the lever 42 to the blade release position. The first end 36 of the blade 30 is inserted into the recess 24 of the hacksaw handle 22. Either the intermediate portion 40 or the second end 38 of the blade 30 is seated in the gap 80 between the frame 26 and washer 50, and against the shoulder 58 of the recess 56. The tab 62 of the lever 42 prevents the user from accidentally inserting the blade 30 between the washer 50 and the resilient member 48, or between the resilient member 48 and the lever 42.

Depending upon the blade width 78, the gap 80 may not be wide enough to accommodate the blade 30 and the blade retention mechanism 28 can be recalibrated in order to increase the gap 80. Likewise, if the lever 42 reaches the blade coupling position (i.e., contacts the support frame 26) before the blade retention mechanism 28 is tight enough to hold the blade 30 in place (e.g., the gap is too wide), the user can recalibrate the blade retention mechanism 28 in order to decrease the gap 80. Recalibration of the blade retention mechanism 28 also provides a clamping force adjustment.

To recalibrate the blade retention mechanism 28 to increase the gap 80, the user removes the clip 46 from the clip slot 72 on the fastener 44 and slides the lever 42 off the inner bolt head 68. After the lever 42 is removed, the user rotates the lever 42 toward the frame 26 and repositions the lever 42 onto the inner bolt head 68. The user then continues to rotate the lever 42 to the blade release position sufficiently to increase the gap 80 to accommodate the blade 30. Once the blade 30 is seated, the user replaces the clip 46 in the clip slot 72 of the fastener 44 to hold the lever 42 on the inner bolt head 68.

To decrease the gap 80, the user removes the lever 42 as discussed above and rotates the lever 42 away from the frame 26 and repositions the lever 42 on the inner bolt head 68. The user continues to rotate the lever 42 toward the frame 26 and to the blade coupling position in order to reduce the gap 80 between the frame 26 and the washer 50. Once the gap 80 is decreased enough to hold the blade 30 when the lever 42 is in the blade coupling position, the clip 46 is replaced in the clip slot 72 of the fastener 44 to hold the lever 42 on the inner bolt head 68.

To release the blade 30 from the blade retention mechanism 28, the user rotates the lever 42 away from the support frame 26 to the blade release position. The lever 42 unthreads the fastener 44 from the nut 52 to reduce the compressive force about the blade 30. If the lever 42 reaches the blade release position before the blade retention mechanism 28 is loose enough to release the blade 30, the user is able to recalibrate the blade retention mechanism 28 by re-adjusting the lever 42 similar to the method describe above.

Figure 7:
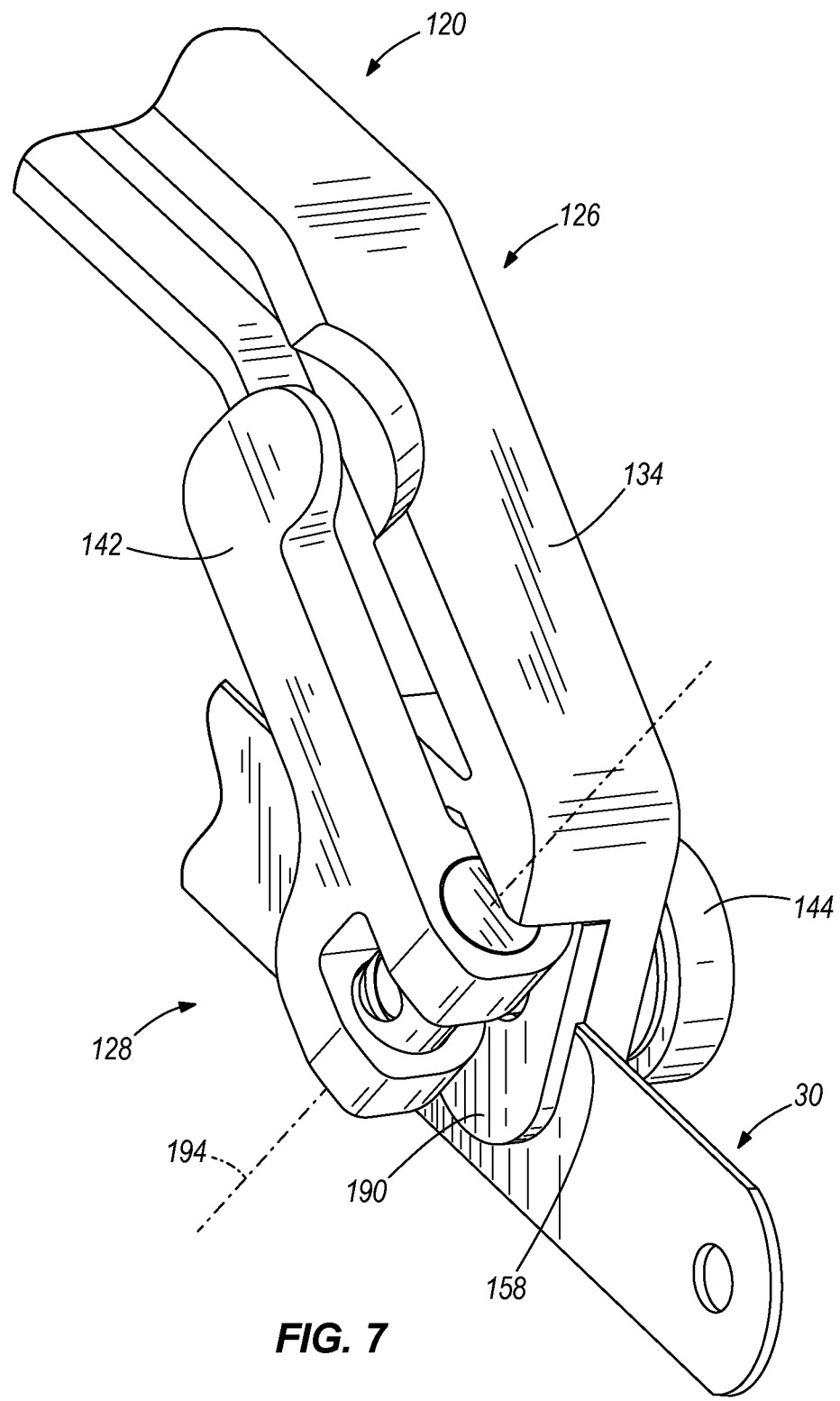
FIG. 7 is a perspective view of a portion of a hacksaw including a blade retention mechanism according to another embodiment of the invention.
Figure 8:
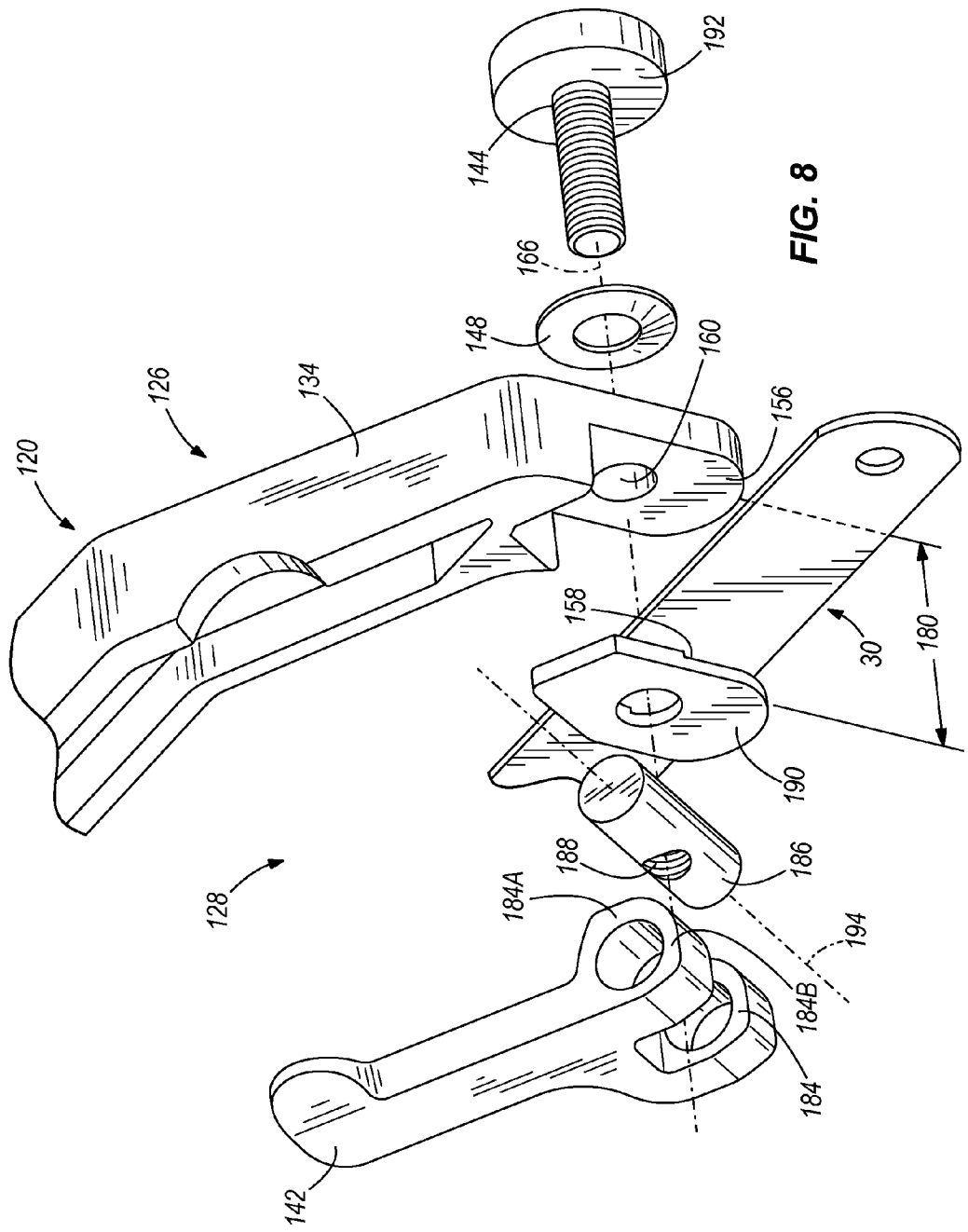
FIG. 8 is an exploded perspective view of the hacksaw shown in FIG. 7.

FIGS. 7 and 8 illustrate a blade retention mechanism 128 according to another embodiment of the invention and for use with a hacksaw 120. The blade retention mechanism 128 is similar to the blade retention mechanism 28 illustrated in FIGS. 1-6. Accordingly, features of the blade retention mechanism 128 that are similar to the features of blade retention mechanism 28 have been given similar reference numbers, plus 100. Differences between the blade retention mechanism 28 of FIGS. 1-6 and the blade retention mechanism 128 of FIGS. 7-8 will be discussed in detail below and it should be understood that the features and alternative constructions of the blade retention mechanism 28 discussed above could also be applied to the blade retention mechanism 128.

The blade retention mechanism 128 includes a lever 142 having a cam portion 184, a cam lever pin 186 having a threaded aperture 188, a plate member 190 defining a shoulder 158, a resilient member 148 (e.g., a Belleville washer in the illustrated embodiment), and a fastener 144 defining a fastener axis 166. The hacksaw 120 includes a frame 126 having a recess 156 defined in a second leg 134 of the frame 126. The frame recess 156 helps position the blade 30 relative to the blade retention mechanism 128 and prevents the plate member 190 from rotating.

In the illustrated embodiment, the fastener 144 and the resilient member 148 are positioned on one side of the second leg 134 (i.e., opposite the recess 156), whereby the resilient member 148 biases the fastener 144 away from the frame 126. The lever 142, the cam lever pin 186 and the plate member 190 are positioned on the opposite side of the second leg 134 (i.e., adjacent the recess 156). The cam lever pin 186 is positioned within the cam portion 184 of the lever 142, such that the cam portion 184 rotates about the pin 186, and the plate member 190 is positioned adjacent the cam portion 184. The fastener 144 extends through an aperture 160 formed in the second leg 134 of the frame 126 and is threadably coupled to the aperture 188 of the cam lever pin 186. The resilient member 148 is seated on the fastener 144 and is positioned between the second leg 134 and a head 192 of the fastener 144. The blade 30 is positioned in a gap 180 formed between the plate member 190 and the second leg 134 of the frame 126, and the blade 30 is positioned against the shoulder 158 of the plate member 190.

In the illustrated embodiment, the lever 142 is an over-center cam style lever. The cam 184 includes a first section 184A and a second section 184B, which has a thickness less than a thickness of the first section 184A. When the blade retention mechanism 128 is assembled and coupled to the frame 126, the lever 142 is rotatable about a pivot axis 194, which is defined by the cam lever pin 186 and is normal to the fastener axis 166. The lever 142 is rotatable about the cam lever pin 186 and the pivot axis 194 between a blade coupling position, illustrated in FIG. 7, and a blade release position (not shown).

Rotating the lever 142 to the blade coupling position, in which the lever 142 is positioned against the second leg 134 of the frame 126, engages the first section 184A of the cam portion 184 with the plate member 190 and forces the plate member 190 toward the frame 126. Such rotation also causes the cam lever pin 186 to move away from the frame 126, which pulls the fastener 144 toward the frame 126 and the fastener head 192 progressively into the resilient member 148. In the blade coupling position, the gap 180 between the plate member 190 and the frame 126 is decreased in order to clamp the blade 30 therebetween. The resilient member 148 provides a compressive force on the fastener 144 to force the fastener 144 away from the frame 126 such that the fastener 144 pulls the cam lever pin 186, and thereby the plate member 190, toward the frame 126. The resilient member 148 maintains compression in the blade retention mechanism 128 over a broad range of engagement between the fastener 144 and the cam lever pin 186, including up until the blade 30 is securely coupled to the frame 126.

In the blade release position, the lever 142 is rotated away from the second leg 134 of the frame 126 about the pivot axis 194 in order to engage the second section 184B of the cam portion 184 with the plate member 190, and thereby loosen the blade retention mechanism 128. When the thinner second section 184B of the cam portion 184 engages the plate member 190, the plate member 190 is allowed to move away from the frame 126. Such rotation also causes the cam lever pin 186 to move toward the frame 126, which pushes the fastener 144 and the fastener head 192 away from the frame 126. In the blade release position, the gap 180 between the plate member 190 and the frame 126 is increased in order to release the blade 30 from the blade retention mechanism 128. In the blade release position, the resilient member 148 reduces the compressive force applied to the fastener 144; thereby, allowing the plate member 190 to move relative to the frame 126 and permit removal of the blade 30. In some conditions, the resilient member 148 maintains some compression in the blade retention mechanism 128 when the lever 142 is in the blade release position; however, in most conditions the compression is reduced to zero.

In order to secure the blade 30 to the frame 126, a user first rotates the lever 142 to the blade release position. The first end 36 of the blade 30 is inserted into the recess 24 of the hacksaw handle 22. Either the intermediate portion 40 or the second end 38 of the blade 30 is seated in the gap 180 between the frame 126 and plate member 190. The blade 30 is also positioned against the shoulder 158 on the plate member 190.

Depending upon the blade width 78 of the blade 30, the gap 180 may not be wide enough to accommodate the blade 30 and the blade retention mechanism 128 can be recalibrated in order to increase the gap 180. Likewise, if the lever 142 reaches the blade coupling position (i.e., contacts the support frame 126) before the blade retention mechanism 128 is tight enough to hold the blade 30 in place (e.g., the gap 180 is too wide), the user can recalibrate the blade retention mechanism 128 in order to decrease the gap 180. Recalibration of the blade retention mechanism 128 provides a clamping force adjustment.

To increase the gap 180 while the lever 142 is in the blade release position, the user loosens the fastener 144 relative to the cam lever pin 186. As the fastener 144 is unthreaded from the cam lever pin 186, the width of the gap 180 increases until the hacksaw blade 30 is insertable between the plate member 190 and the frame 126. Once the blade 30 is seated, the user rotates the lever 142 to the blade coupling position to tighten the blade retention mechanism 128 about the blade 30 and couple the blade 30 to the frame 126. To decrease the gap 180 while the lever 142 is in the blade release position, the user tightens the fastener 144 relative to the cam lever pin 186. As the fastener 144 is threaded into the cam lever pin 186, the width of the gap 180 decreases. The user then rotates the lever 142 to the blade coupling position to tighten the blade retention mechanism 128 about the hacksaw blade 30.

To release the blade 30 from the blade retention mechanism 128 in order to remove the blade 30 from the frame 126, the user rotates the lever 142 away from the support frame 126 to the blade release position. The lever 142 unthreads the fastener 144 from the cam lever pin 186 to reduce the compressive force about the blade 30. If the lever 142 reaches the blade release position before the blade retention mechanism 128 is loose enough to release the blade 30, the user is able to recalibrate the blade retention mechanism 128 similar to the method describe above.

Figure 9:
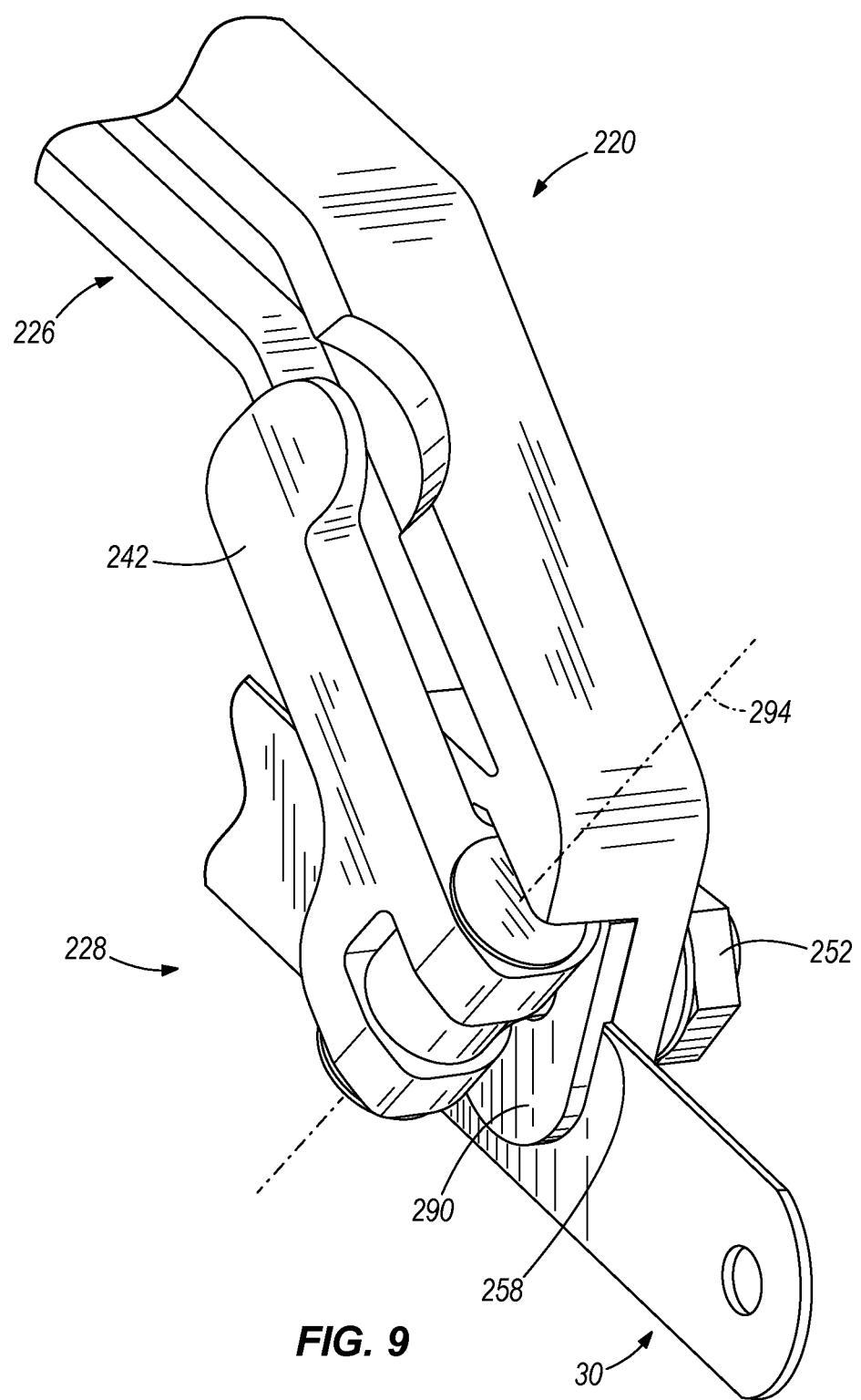
FIG. 9 is a perspective view of a portion of a hacksaw including a blade retention mechanism according to another embodiment of the invention.
Figure 10:
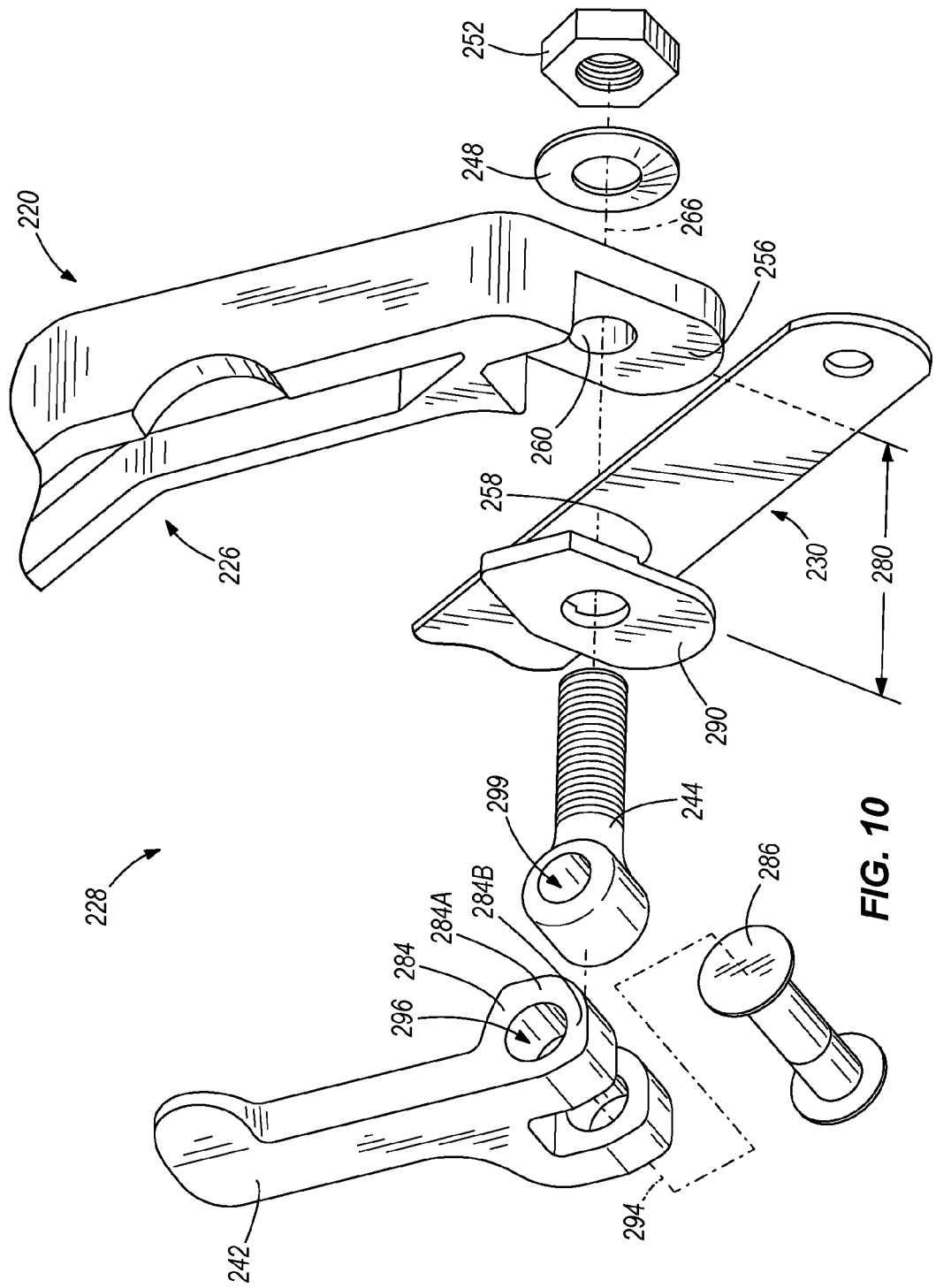
FIG. 10 is an exploded perspective view of the hacksaw shown in FIG. 9.

FIGS. 9 and 10 illustrate a blade retention mechanism 228 according to another embodiment of the invention. The blade retention mechanism 228 is similar to the blade retention mechanism 128 illustrated in FIGS. 7-8. Accordingly, features of the blade retention mechanism 228 that are similar to the features of blade retention mechanism 128 have been given similar reference numbers, plus 100. Also, only differences between the blade retention mechanism 128 of FIGS. 7-8 and the blade retention mechanism 228 of FIGS. 9-10 will be discussed in detail below and it should be understood that the features and alternative constructions of the blade retention mechanism 128 discussed above could also be applied to the blade retention mechanism 228.

The blade retention mechanism 228 includes an eyebolt-type fastener 244 and a nut 252 coupled together to retain the blade retention mechanism 228 on a frame 226 of a hacksaw 220. A lever 242 includes a cam portion 284 and an aperture 296 for receiving a cam lever pin 286. In the illustrated embodiment, the lever 242 is an over-center cam style lever. The cam portion 284 includes a first section 284A and a second section 284B, which has a thickness less than a thickness of the first section 284A. An eye portion 299 of the fastener 244 is seated on the cam lever pin 286, and the cam lever pin 286 defines a pivot axis 294, which is substantially perpendicular to a fastener axis 266.

The lever 242 pivots about the pivot axis 294 such that the cam portion 284 compresses and releases a plate member 290 in order to tighten and loosen, respectively, the blade retention mechanism 228. A frame recess 256 defined by the frame 226 helps position the blade 30 relative to the blade retention mechanism 228 and prevents the plate member 290 from rotating. The blade 30 is seated in a gap 280 formed between the plate member 290 and the frame 226, and the blade 30 is positioned against a shoulder 258 of the plate member 290.

In use, the blade retention mechanism 228 of FIGS. 9 and 10 functions and operates similarly to the blade retention mechanism 128 of FIGS. 7 and 8. When the blade retention mechanism 228 is assembled and coupled to the frame 226, the lever 242 is rotatable about the pivot axis 294 between a blade coupling position, illustrated in FIG. 9, and a blade release position (not shown).

Rotating the lever 242 to the blade coupling position engages cam section 284A with plate member 290 and moves the plate member 290 towards the frame 226. Rotation also causes the cam lever pin 286 to move away from the frame 226, which pulls the fastener 244 away from the frame 226 and the nut 252 is pulled progressively into a resilient member 248. The resilient member 248 provides a compressive force on the nut 252 to force the nut 252 away from the frame 226 such that the nut 252 pulls the fastener 244, and thereby the plate member 290, toward the frame 226. The resilient member 248 maintains tension in the blade retention mechanism 228 over a broad range of engagement between the fastener 244 and the nut 252, including up until the blade 30 is securely coupled to the frame 226.

In the blade release position, the gap 280 between the plate member 290 and the frame 226 is increased in order to release the blade 30 from the blade retention mechanism 228. In the blade release position, rotation of the lever 242 engages the thinner cam section 184B with the plate member 290, which causes the cam lever pin 286 to move toward the frame 226, and allows the resilient member 248 to push the nut 252 away from the frame 126. Cam section 184B allows the plate member 290 to move relative to the frame 226 and permit removal of the blade 30. In some conditions, the resilient member 248 maintains some compression in the blade retention mechanism 228 when the lever 242 is in the blade release position; however, in most conditions the compression is reduced to zero.

If the gap 280 is too wide or not wide enough, a user will need to recalibrate the blade retention mechanism 228 in order to decrease or increase the gap 280. Recalibration of the blade retention mechanism 228 also provides a clamping force adjustment. To increase the gap 280 while the lever 242 is in the blade release position, the user loosens the nut 252 relative to the fastener 244. As nut 252 is unthreaded from the fastener 244, the width of the gap 280 increases until the hacksaw blade 30 is insertable between the plate member 290 and the frame 226. Once the blade 30 is seated, the user rotates the lever 242 to the blade coupling position to tighten the blade retention mechanism 228 about the blade 30 and couple the blade 30 to the frame 226. To decrease the gap 280 while the lever 242 is in the blade release position, the user tightens the nut 252 relative to the fastener 244. As the nut 252 is threaded onto the fastener 244, the width of the gap 280 decreases. The user then rotates the lever 242 to the blade coupling position to tighten the blade retention mechanism 228 about the hacksaw blade 30.

Figure 11:
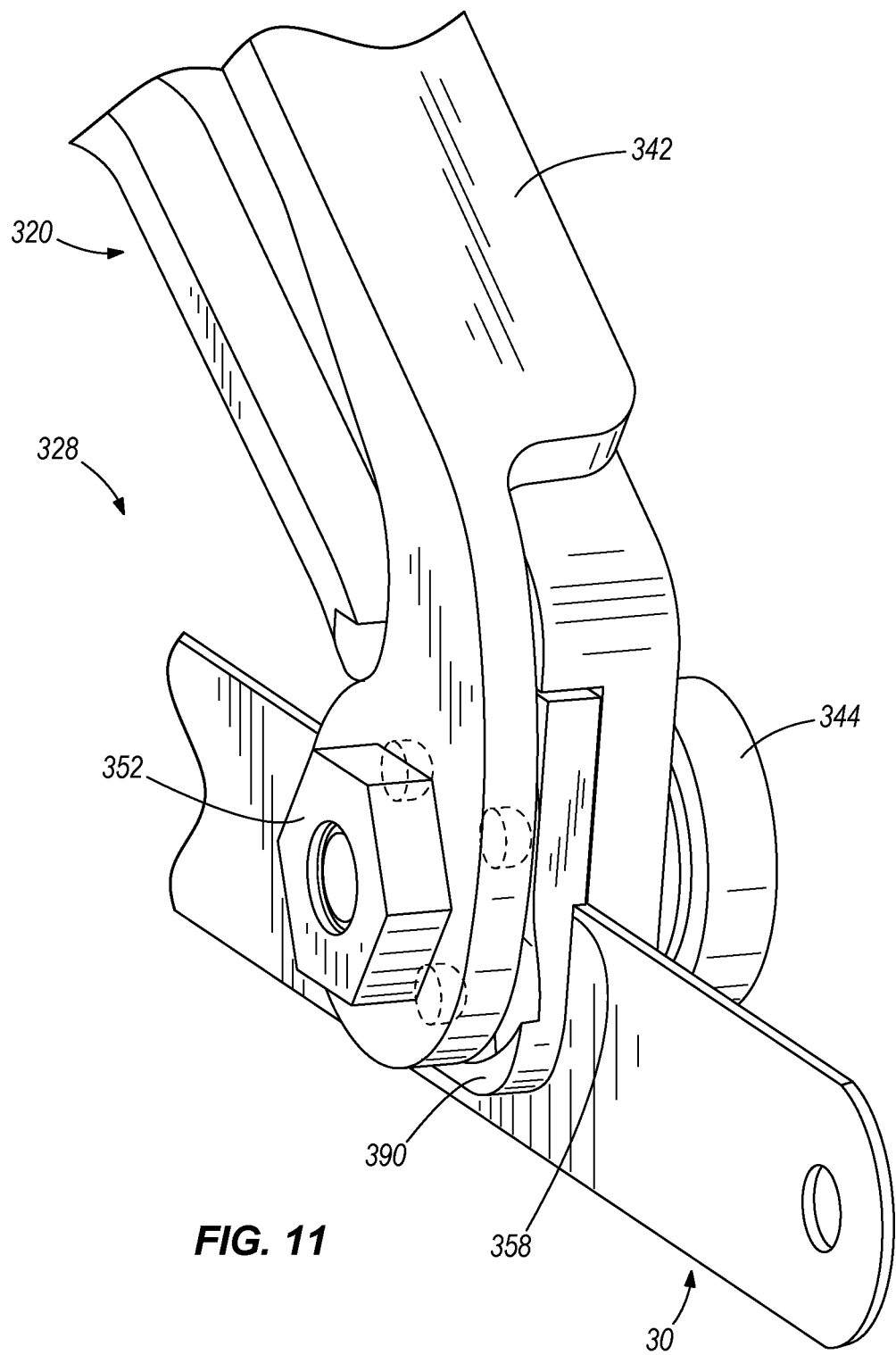
FIG. 11 is a perspective view of a portion of a hacksaw including a blade retention mechanism according to another embodiment of the invention.
Figure 12:
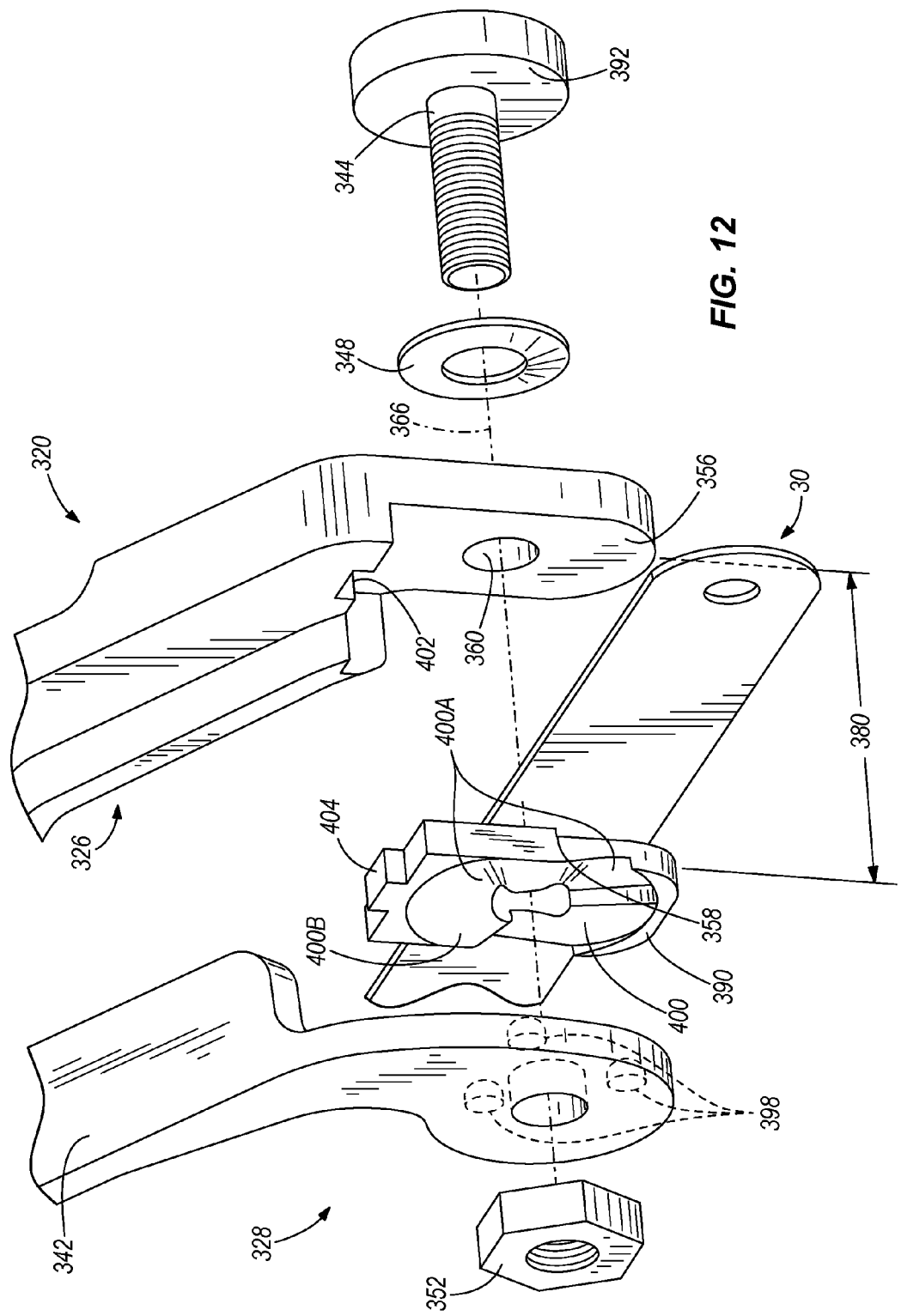
FIG. 12 is an exploded perspective view of the hacksaw shown in FIG. 11.

FIGS. 11 and 12 illustrate a blade retention mechanism 328 according to another embodiment of the invention and for use with a hacksaw 320. The blade retention mechanism 328 is similar to the blade retention mechanism 128 illustrated in FIGS. 7-8. Accordingly, features of the blade retention mechanism 328 that are similar to the features of blade retention mechanism 128 have been given similar reference numbers, plus 200. Also, only differences between the blade retention mechanism 128 of FIGS. 7-8 and the blade retention mechanism 328 of FIGS. 11-12 will be discussed in detail below and it should be understood that the features and alternative constructions of the blade retention mechanism 128 discussed above could also be applied to the blade retention mechanism 328.

The blade retention mechanism 328 includes a lever 342 having lobes 398, a plate member 390 defining a shoulder 358, a nut 352, a resilient member 348 (e.g., a Belleville washer in the illustrated embodiment), and a fastener 344 defining a fastener axis 366. The plate member 390, or sheave, includes a cam surface 400 on a first side of the member 390 that interfaces with the lobes 398 of the lever 342. An opposite side of the plate member 390 defines the shoulder 358 for positioning the hacksaw blade 30. The hacksaw 320 includes a frame 326 having a recess 356 defined in a second leg 334 of the frame 326. The frame recess 356 helps position the blade 30 relative to the blade retention mechanism 328 and prevents the plate member 390 from rotating. The second leg 334 of the frame 326 also includes a key way 402 that receives a key 404 formed on the plate member 390 to further position the plate member 390 relative to the frame 326 and prevent rotation of the plate member 390.

In the illustrated embodiment, the fastener 344 and the resilient member 348 are positioned on one side of the second leg 334 (i.e., opposite the recess 356), whereby the resilient member 348 biases the fastener 344 away from the frame 326. The lever 342, the nut 352 and the plate member 390 are positioned an opposite side of the second leg 334 (i.e., adjacent the recess 356). The fastener 344 extends through an aperture 360 formed in the second leg 334 of the frame 326 and is threadably coupled to the nut 352. The resilient member 348 is seated on the fastener 344 and is positioned between the second leg 334 of the frame 326 and a head 392 of the fastener 344. The blade 30 is positioned in a gap 380 formed between the plate member 390 and the second leg 334 of the frame 326, and the blade 30 is positioned against the shoulder 358 of the plate member 390.

In the illustrated embodiment, the lever 342 is a cam style lever and rotates about the fastener axis 366. As the lever 342 is rotated, the lobes 398 of the lever 342 ride along the cam surface 400 of the plate member 390. The cam surface 400 includes first portions 400A and second portions 400B, which have a thickness greater than a thickness of the first portions 400A. When the blade retention mechanism 328 is assembled and coupled to the frame 326, the lever 342 is rotatable about the fastener axis 366 between a blade coupling position, illustrated in FIG. 11, and a blade release position (not shown).

Rotating lever 342 to the blade coupling position, in which the lever 342 is positioned against the second leg 334 of the frame 326, engages the lobes 398 with the second portions 400B (i.e., the thicker portions) of the plate member cam surface 400 and forces the plate member 390 toward the frame 326. Such rotation also moves the lever 342 away from the frame 326, which pulls the fastener 344 toward the frame 326 and pulls the fastener head 392 progressively into the resilient member 348. The compression of the plate member 390 toward the frame 326 decreases the gap 380 between the plate member 390 and the frame 326 in order to clamp the blade 30 therebetween. The resilient member 348 provides a compressive force on the fastener 344 to force the fastener head 392 away from the frame 326 such that the fastener 326 pulls the nut 352, and thereby the plate member 390, toward the frame 326. The resilient member 348 maintains compression in the blade retention mechanism 328 over a broad range of engagement between the fastener 344 and the nut 352, including up until the blade 30 is securely coupled to the frame 326.

In the blade release position, the lever 342 is rotated away from the second leg 334 of the frame 326 such that the lobes 398 ride along the cam surface 400 to the first sections 400A (i.e., the thinner sections), and thereby loosen the blade retention mechanism 328 by allowing the resilient member 348 to relax to a less compressed, or non-compressed state. When the lobes 398 engage the first sections 400A of the plate member cam surface 400, the plate member 390 is allowed to move away from the frame 326. Such rotation also causes the lever 342 to move toward the frame 326, which pushes the fastener 344 and the fastener head 392 away from the frame 326. In the blade release position, the gap 380 between the plate member 390 and the frame 326 is increased in order to release the blade 30 from the blade retention mechanism 328. Further, the resilient member 348 reduces the compressive force applied to the fastener 344; thereby, allowing the plate member 390 to move relative to the frame 326 and permit removal of the blade 30. In some conditions, the resilient member 348 maintains some compression in the blade retention mechanism 328 when the lever 342 is in the blade release position; however, in most conditions the compression is reduced to zero.

In order to secure the blade 30 to the frame 326, a user first rotates the lever 342 to the blade release position. The first end 36 of the blade 30 is inserted into the recess 24 of the hacksaw handle 22. Either the intermediate portion 40 or the second end 38 of the blade 30 is seated in the gap 380 between the frame 326 and the plate member 390, and against the shoulder 358 on the plate member 390.

Depending upon the blade width 78 of the blade 30, the gap 380 may not be wide enough to accommodate the blade 30 and the blade retention mechanism 328 may be recalibrated in order to increase the gap 380. Likewise, if the lever 342 reaches the blade coupling position (i.e., contacts the support frame 326) before the blade retention mechanism 328 is tight enough to hold the blade 30 in place (e.g., the gap 380 is too wide), the user is able to recalibrate the blade retention mechanism 328 in order to decrease the gap 380. Recalibration of the blade retention mechanism 328 provides a clamping force adjustment.

To increase the gap 380 while the lever 342 is in the blade release position, the user rotates loosens the fastener 344 relative to the nut 352. As the fastener 344 is unthreaded from the nut 352, the width of the gap 380 increases until the hacksaw blade 30 is insertable between the plate member 390 and the frame 326. Once the blade 30 is seated, the user rotates the lever 342 to the blade coupling position to tighten the blade retention mechanism 328 about the blade 30 and couple the blade 30 to the frame 326. To decrease the gap 380 while the lever 342 is in the blade release position, the user tightens the fastener 344 relative to the nut 352. As the fastener 344 is threaded into the nut 352, the width of the gap 380 decreases. The user then rotates the lever 342 to the blade coupling position to tighten the blade retention mechanism 328 about the hacksaw blade 30.

To release the blade 30 from the blade retention mechanism 328 in order to remove the blade 30 from the frame 326, the user rotates the lever 342 to the blade release position. The lever 342 unthreads the fastener 344 from the nut 352 to reduce the compressive force on the blade 30. If the lever 342 reaches the blade release position before the blade retention mechanism 328 is loose enough to release the blade 30, the user is able to recalibrate the blade retention mechanism 328 similar to the method describe above.

Although particular constructions embodying independent aspects of the present invention have been shown and described, other alternative constructions will become apparent to those skilled in the art and are within the intended scope of the independent aspects of the invention. Various features and advantages of the invention are set forth in the following claims.

What is claimed is:

1. A hacksaw comprising:
   a handle including a first recess;
   a frame including a first end and a second end, the first end coupled to the handle and the second end extending away from the handle, the second end of the frame defining a second recess;
   a saw blade including a first end, a second end, a first side, and a second side, the first end of the saw blade received within the first recess of the handle and the second end of the saw blade extending away from the handle, wherein a portion of the saw blade is removeably coupled to the second end of the frame; and
   a blade retention mechanism coupled to the second end of the frame, the blade retention mechanism comprising,
   a fastener coupled to the second end of the frame for coupling the blade retention mechanism to the frame,
   a resilient member seated on the fastener,
   a retaining member seated on the fastener adjacent the second recess of the frame, and
   a lever coupled to the fastener and movable between a first position to couple the saw blade to the frame and a second position to release the saw blade from the frame,
   wherein the portion of the saw blade removably coupled to the second end of the frame is positioned within the second recess of the frame and between the frame and the retaining member such that the first side of the saw blade engages the frame and the second side of the saw blade engages the retaining member,
   wherein when the lever is moved to the first position the lever tightens the blade retention mechanism in order to compress the resilient member and clamp the saw blade between the frame and the retaining member, and when the lever is rotated to the second position the lever loosens the blade retention mechanism in order to reduce compression on the retaining member, and wherein when the lever is in the second position, the blade retention mechanism is adjustable to change a distance between the frame and the retaining member.

2. The hacksaw of claim 1, further comprising a shoulder defined by one of the frame and retaining member, the shoulder positioned for aligning an edge of the saw blade between the frame and retaining member.

3. The hacksaw of claim 1, wherein when the lever is in the first position the resilient member maintains relatively constant compression in the blade retention mechanism.

4. The hacksaw of claim 1, wherein when the lever is in the second position the resilient member maintains compression in the blade retention mechanism.

5. The hacksaw of claim 1, wherein the lever includes a socket that engages the fastener, and further wherein when the lever is rotated to the first position, the lever rotates the fastener in a first direction to tighten the blade retention mechanism and compress the resilient member and compress the saw blade between the frame and the retaining member, and when the lever is rotated to the second position, the lever rotates the fastener in the second direction to loosen the blade retention mechanism and reduce compression on the resilient member and the saw blade between the frame and the retaining member.

6. The hacksaw of claim 5, wherein the lever is removable from the fastener in order to reposition the socket of the lever relative to the fastener.

7. The hacksaw of claim 5, wherein the blade retention mechanism includes a clip for removeably coupling the lever to the fastener.

8. The hacksaw of claim 1, wherein the lever includes a cam portion that is positioned adjacent the retaining member, and further wherein when the lever is rotated to the first position, the cam portion displaces the retaining member to compress the resilient member and the saw blade between the frame and the retaining member, and when the lever is rotated to the second position, the cam portion releases the retaining member to reduce compression on the resilient member and the saw blade between the frame and the retaining member.

9. The hacksaw of claim 1, wherein the retaining member includes a cam surface including a first cam section and a second cam section having a thickness greater than a thickness of the first cam section, and the lever includes at least one lobe that acts on the cam surface.

10. The hacksaw of claim 9, wherein when the lever is rotated to the first position, the lobe engages the second cam section to displace the retaining member and compress the resilient member and the saw blade between the frame and the retaining member, and when the lever is rotated to the second position, the lobe engages the first cam section of the cam surface to reduce compression on the resilient member and the saw blade between the frame and the retaining member.

11. The hacksaw of claim 1, wherein the retaining member is keyed to the frame to prevent rotation of the retaining member relative to the frame.

12. The hacksaw of claim 1, wherein when the lever is in the second position the resilient member maintains no compression in the blade retention mechanism.

13. A hacksaw including a removable blade, the hacksaw comprising:

a handle including a recess configured to receive the blade;

a frame including a first end and a second end, the first end coupled to the handle and the second end extending away from the handle; and a blade retention mechanism coupled to the second end of the frame and for coupling the blade to the second end of the frame, the blade retention mechanism comprising, an adjustable fastener coupled to the frame and coupling the blade retention mechanism to the frame, a resilient member seated on the fastener, a retaining member seated on the fastener, the retaining member spaced apart from the frame by a distance, and a lever coupled to the fastener and movable between a first position and a second position, wherein moving the lever to the first position reduces the distance between the retaining member and the frame to clamp the blade within the blade retention mechanism and couple the blade to the frame, and moving the lever to the second position increases the distance between the retaining member and the frame to release the blade from the blade retention mechanism, and wherein when the lever is in the second position, movement of the fastener relative to the frame adjusts the distance.

14. The hacksaw of claim 13, further comprising a shoulder on one of the frame and retaining member, the shoulder positioned for aligning an edge of the blade between the frame and the retaining member.

15. The hacksaw of claim 13, wherein when the lever is in the first position, the blade is clamped between the retaining member and the frame to couple the blade to the frame.

16. The hacksaw of claim 15, wherein when the lever is in the first position, the resilient member applies relatively constant compression in the blade retention mechanism over a range of fastener positions.

17. The hacksaw of claim 13, wherein when the lever is in the second position the resilient member maintains compression in the blade retention mechanism.

18. The hacksaw of claim 13, wherein the lever includes a socket that engages the fastener, and further wherein when the lever is rotated to the first position, the fastener compresses the resilient member and compresses the blade between the frame and the retaining member, and when the lever is rotated to the second position, the fastener reduces compression on the resilient member and on the blade between the frame and the retaining member.

19. The hacksaw of claim 18, wherein the lever is removable from the fastener in order to reposition the socket of the lever relative to the fastener.

20. The hacksaw of claim 18, wherein the blade retention mechanism includes a clip for removeably coupling the lever to the fastener.

21. The hacksaw of claim 13, wherein the lever includes a cam portion that is positioned adjacent the retaining member, and further wherein when the lever is rotated to the first position, the cam portion displaces the retaining member to compress the resilient member and the blade between the frame and the retaining member, and when the lever is rotated to the second position, the cam portion releases the retaining member to reduce compression on the resilient member and the blade between the frame and the retaining member.

22. The hacksaw of claim 13, wherein the retaining member includes a cam surface including a first cam section and a second cam section having a thickness greater than a thickness of the first cam section, and the lever includes at least one lobe that acts on the cam surface.

23. The hacksaw of claim 22, wherein when the lever is rotated to the first position, the lobe engages the second cam section of the cam surface to displace the retaining member and compress the resilient member and the blade between the frame and the retaining member, and when the lever is rotated to the second position, the lobe engages the first cam section of the cam surface to reduce compression on the resilient member and the blade between the frame and the retaining member.

24. The hacksaw of claim 13, wherein the retaining member is keyed to the frame to prevent rotation of the retaining member relative to the frame.

25. The hacksaw of claim 13, wherein when the lever is in the second position the resilient member maintains no compression in the blade retention mechanism.

* * * * *